United States Patent [19]
Ibbott

[11] Patent Number: 5,358,617
[45] Date of Patent: Oct. 25, 1994

[54] SELF-CONTAINED WATER TREATMENT DEVICE

[75] Inventor: Jack K. Ibbott, Tokyo, Japan

[73] Assignee: Makiko Yoshida, Tokyo, Japan

[21] Appl. No.: 977,248

[22] Filed: Nov. 16, 1992

[51] Int. Cl.$^5$ .......................... C25B 9/00; C25B 11/04
[52] U.S. Cl. .................... 204/248; 204/290 R
[58] Field of Search ............ 204/248, 249, 150, 290 R

[56] References Cited

U.S. PATENT DOCUMENTS

| | | | |
|---|---|---|---|
| 2,451,065 | 10/1948 | Butler | 204/248 |
| 3,379,633 | 4/1968 | Green | 204/150 X |
| 3,392,102 | 7/1968 | Koch | 204/150 X |
| 3,451,913 | 6/1969 | Laborde et al. | 204/248 |
| 4,325,798 | 4/1982 | Mack | 204/248 |

FOREIGN PATENT DOCUMENTS 276254  8/1927  United Kingdom .

*Primary Examiner*—Donald R. Valentine
*Attorney, Agent, or Firm*—Wenderoth, Lind & Ponack

[57] ABSTRACT

A self-contained water treatment device to facilitate the washing of articles, such as clothes in a conventional washing machine, includes a body, a first electrode in the form of a layer of paint of an electrically conductive material integrated with the body, and a second electrode of a layer of paint of an electrically conductive material integrated with the body. The electrically conductive paints of the first and second electrodes have different electrochemical potentials and are at least in part spaced apart from one another on an electrically insulative surface of the device so as to be electrically isolated from one another. The device also has sufficient buoyancy so as to float in water. In use, the device is placed into a reservoir of water, such as the tub of a conventional clothes washing machine or dish washing machine, and the tub is filled with water and the articles to be washed. When the machine is turned on and the water is agitated, the device circulates freely throughout the volume of water throughout the water in the tub and the water is in contact with the electrodes. Thus, the water is ionized due to the electric potential established between the electrodes and such ionized water is more effective in washing the articles in the tub. Alternatively, the electrodes may be in the form of mixtures of electrically conductive material and a plastic binding agent, with the body and the electrodes each being a molded segment of a sphere so as to together constitute a ball-shaped device.

21 Claims, 1 Drawing Sheet

SELF-CONTAINED WATER TREATMENT DEVICE

BACKGROUND OF THE INVENTION

The present invention relates to a method and device for facilitating the washing of articles, such as clothes, dishes, etc. by ionizing the water in which the articles are normally washed.

Various physical or non-chemical treatment devices commonly on the market are recognized as having an advantageous effect on water used to wash clothes or dishes and on bathwater. In the case of washing clothes and dishes, this advantageous effect is the apparent softening of the water. However, the total amount of dissolved solids in the water remains unchanged unlike chemical treatment to soften water in which the dissolved solid content is actually removed from the water.

In the case of washing clothes, a large amount of washing detergent or soap powder in the water is required.

U.S. Pat. No. 4,902,391 by the present inventor discloses a device for ionizing water and which device includes two electrodes having different electrochemical potentials, such as a carbon electrode and an aluminum electrode. The electrodes are electrically isolated from one another such that when water is forced to flow over and past the electrodes, the only electroconductive connection between the electrodes is formed by the water itself which has some degree of electroconductivity. The water is thus ionized due to the electrochemical potential established between the electrodes. Devices such as the one disclosed in U.S. Pat. No. 4,902,391 are typically applied in-line in a water pipeline to effect the treatment of water flowing through the pipeline so as to prevent the occurrence of a scale from being produced on the interior surface of the pipeline or to remove such a scale already formed. Even if such a device were used for water treatment per se, such a device would require the services of a plumber for installation. Further, such devices are relatively costly.

SUMMARY OF THE INVENTION

An object of the present invention is to provide a very simple means of treating water by which much less liquid detergent or soap powder is necessary to achieve a satisfactory washing of articles in the water. For example, an object of the present invention is to provide a method and device which so facilitates the washing of clothes that the clothes can be effectively washed without the use of liquid detergent or soap powder when the water has a fairly low amount of dissolved solids.

Another object of the present invention is to provide a device to facilitate washing which can be produced at a very low cost and which does not require installation, but which can provide the advantages of more sophisticated devices used for treating water.

To achieve the objects above, a self-contained water treatment device of the present invention includes a main body, a first electrode of electrically conductive material integrated with the body, and a second electrode of electrically conductive material integrated with the body. The electrically conductive materials constituting the first and second electrodes have different electrochemical potentials. When the device is placed in a reservoir of water, such as a tub of a conventional clothes washing machine or dish washing machine, water in the tub flows over and between the electrodes of different electrochemical potentials. Thus, an electric potential is developed by and between the electrodes, thereby ionizing the water. As in U.S. Pat. No. 4,902,391, the electrodes may be carbon based and aluminum based, respectively.

According to a unique feature of the present invention, the self-contained water treatment device has a body in the form of a ball and an electrically insulative surface, and the electrodes are formed by applying respective layers of electrically conductive paint onto the insulative surface. Alternatively, the body may comprise an electrically insulative plastic material in the form of a segment of a ball, and the electrodes are formed of electrically conductive materials in the shapes of the remaining segments of the ball which are integrated with the electrically insulative plastic material.

The device so formed can be placed in the tub of the washing machine together with the articles, such as clothes or dishes, to be washed. The action of the machine causes the water to flow over the layers of paints or segments constituting the electrodes so that the electric potential produced between the layers of paint or segments (electrodes) produces an ionizing effect on the water. As water continues to flow over the electrodes as the washing cycle progresses, the electrodes in a very short time cause the entire volume of water in the tub to be ionized.

BRIEF DESCRIPTION OF THE DRAWINGS

These and other objects, features and advantages of the present invention will be understood by those of ordinary skill in the art reviewing the following detailed description thereof made with reference to the accompanying drawings, in which.

DETAILED DESCRIPTION OF THE PREFERRED EMBODIMENTS

Figure 1:
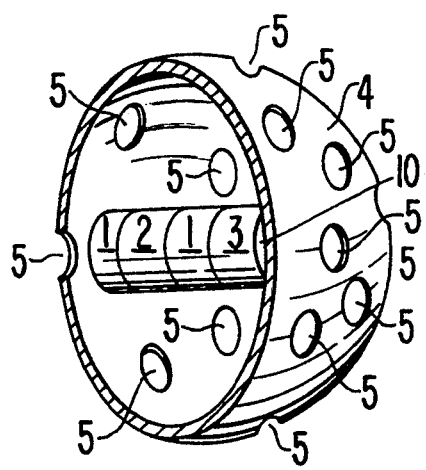
FIG. 1 is a perspective view, partly broken away, of a first embodiment of a self-contained water treatment device according to the present invention.

Referring first to FIG. 1, the self-contained water treatment device of the present invention includes a body 4, a first electrode 2 integral with the body 4, and a second electrode 3 also integral with the body 4.

Because the device is to be placed in the tub of a washing machine, for example, the shape of the body 4 should be such that it is not caught by buttons or the like or by small pieces of cloth, hems, etc. To this end, the body may be generally spheroidal meaning that it is sufficiently rounded to not only meet the above requirements of not being entrapped by the articles being washed, but also to prevent damaging the interior surface of the tub when the water is being agitated during the washing cycle. Although the body can thus assume various actual shapes, a preferred form of the body as shown in FIG. 1 is ball-shaped, i.e. spherical. A spherical body greatly reduces the chance that the device will be caught on or entrapped by articles, such as pieces of clothing, which are being washed.

As also seen in FIG. 1, the body 4 has a plurality of openings 5 extending therethrough and through which openings water can enter the interior of the body. A support member 10 is integral with and extends within the body 4. The support member 10 is of any electrically insulative material, e.g. plastic, so as to present an electrically insulative outer surface.

The first electrode 2 comprises a layer of paint provided on the support member 10, the paint being of an electrically conductive material. Similarly, the second electrode 3 also comprises a layer of paint provided on the support member 10 and spaced from the electrode 2, the paint also being of an electrically conductive material. The electrically conductive paint constituting the first electrode 2 and the electrically conductive paint constituting the second electrode 3 have different electrochemical potentials. Thus, when the self-contained device of FIG. 1 is placed into a reservoir of water, such as in the tub of a conventional clothes washing machine or dish washing machine, water passes through the openings 5 and over the first and second electrodes 2, 3. The water thus provides an electroconductive connection between the electrodes 2, 3 whereby the water is ionized due to the electric potential established between the electrodes.

Another feature of the present invention is that it has sufficient buoyancy so as to float in water. By being able to float in the water used for washing, the self-contained device according to the present invention can effectively ionize the entire volume of water by being free to move throughout the water and among the articles, such as clothes, being washed. Of course, even if the device is not buoyant it would still provide the ionization effect, particularly in the case where the water is strongly agitated such as by the impeller often provided at the central bottom portion of the tub of a conventional clothes washing machine. However, in such a case it is still preferable that the device be buoyant in order to prevent its frequent contact with the impeller so as to reduce both the possibility of damage to the device and to the impeller. Although various means may be used to impart the necessary buoyancy to the device, in the embodiment of FIG. 1 the support member 10 includes at least one sealed air chamber 1 which imparts sufficient buoyancy to the device as to cause the device to float in water.

Figure 2:
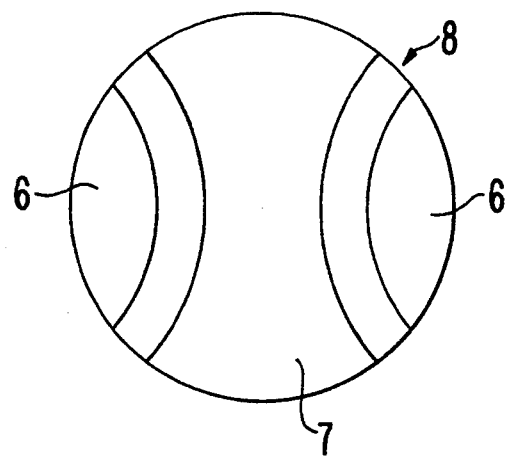
FIG. 2 is a plan view of a second embodiment of a self-contained water treatment device according to the present invention.

The embodiment of FIG. 2 is particularly well-suited for use within the tub of a washing machine. In this embodiment, the body 8 is in the shape of a ball and either is provided with a soft outer cover or consists of any suitable well-known soft material, e.g. sponge rubber, so as to be shock absorbent. This will prevent the device from being damaged as well as from damaging the tub of the washing machine or the articles being washed therein. In any case, the body 8 has a soft outer portion of an electrically insulative material. Similar to the first embodiment, a first electrode 6 comprises a layer of paint of an electrically conductive material coated on the soft outer portion of the body 8. A second electrode 7 also comprises a layer of paint of an electrically conductive material and coated on the soft outer portion of the body 8. Again, the paints of the electrodes 6, 7 have different electrochemical potentials whereby when the device is placed in a reservoir of water, the water extends over and between the electrodes and is thus ionized due to the electric potential established by and between the electrodes.

The body 8 may be hollow so as to define an air chamber therein which imparts the necessary buoyancy to the device. In this case the body may be of rubber or a soft plastic. Alternatively, the body 8 may be made of a soft foamed material so as to be buoyant owing to the many small air chambers possessed by such material.

In the embodiment of FIG. 1, because the electrodes 2, 3 are provided within the body 4 which acts as a protective outer structure, the paint applied to the support member 10 may be of a type which provides a hard surface when dried. However, in the embodiment of FIG. 2, the electrically conductive paint should have some elasticity in order to prevent the paint from chipping off of the surface of the ball-shaped body 8. That is, as noted above, the body 8 should have a soft outer portion so as to be able to absorb shock caused by impact with the washing tub or articles being washed during the agitation of the water by the washing machine. If the paints constituting the electrodes were of a type providing a hard surface when dried, such paints would also harden those areas of the body 8 on which the paints were applied and could consequently produce some sort of damage.

To provide suitable electrically conductive paints which do not provide a hard surface when dried, powder of an electrically conductive material, such as powdered aluminum, can be mixed with a plastic type of binding agent which remains highly pliable when dried. For example, the body 8 can be made of PVC, the first electrode 6 can be made of a mixture of powdered aluminum and liquid PVC (which is commercially available for connecting PVC pipes), and the second electrode can be made of a mixture of powdered carbon and liquid PVC. The liquid PVC thus binds the powdered materials and bonds the same as a paint to the PVC body 8.

Alternatively, when the body 8 is made of rubber, the powdered carbon and powdered aluminum may be mixed with rubber cement to form the paints which are applied to the rubber body 8. In the embodiments of FIGS. 1 and 2, the electrodes are thus essentially painted onto the device. Therefore, the electrodes may take the form of various patterns, shapes or designs so as to have a decorative effect. However, in any case, the electrodes should preferably be spaced apart in their entirety on the electrically insulative surface to which they are applied in order that the only electroconductive connection established between the electrodes is provided by the water which is to be ionized.

On the other hand, there may be some overlap of the painted electrodes to provide a direct electrically conductive connection between the electrodes. In such a case, however, electrolysis will occur at the area of contact of the electrodes and the conductive material of the electrodes will be eventually corroded away until a complete physical separation of the electrodes has been created. This will thus create the same condition as in the preferred condition of painting the electrodes on the electrically insulative surface in a manner in which the electrodes are spaced apart in their entirety.

Figure 3:
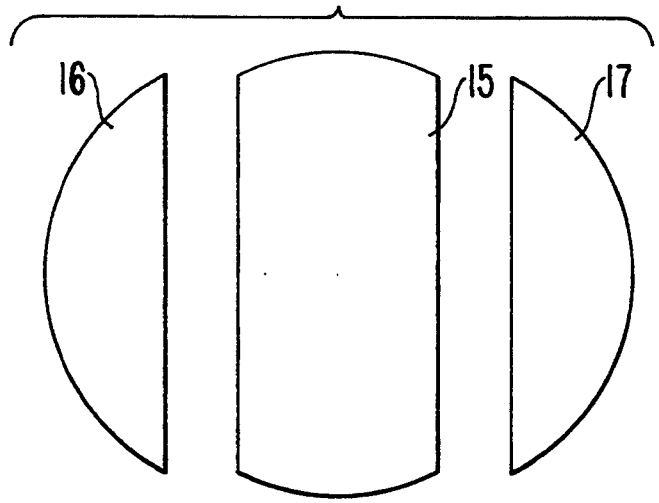
FIG. 3 is an exploded view of a third embodiment of a self-contained water treatment device according to the present invention.

In the embodiment of FIG. 3, the body 15 is of plastic, for example, so as to be electrically insulative. The first and second electrodes 16 and 17 each are of powdered electrically conductive materials bound by a plastic material. The body 15 and the electrodes 16, 17 may thus be molded in the form of respective segments of a sphere so as to together constitute a ball-shaped water treatment device. These segments may be formed separately and then joined together with a suitable adhesive. On the other hand, it is contemplated that the segments may all be formed and joined together at one time by an injection molding machine capable of simultaneously injecting the different materials of the body 15 and electrodes 16, 17 into a mold cavity.

Again, although the embodiment of FIG. 3 is shown as being in the shape of a ball (spherical), the water treatment device of the present invention is not limited to having such a shape but may have the shape of a more general spheroid as long as it is sufficiently rounded to meet the requirements discussed previously.

Even in this embodiment, the device may be made buoyant by providing a suitable material for the body 18 or by providing an air chamber sealed within the device.

The device of the present invention has been described above as self-contained. This refers to the fact that the device according to the present invention need not be connected to any part of the washing machine in order to function effectively and to the fact that the elements comprising the device, i.e. the body and first and second electrodes, are the only elements necessary to effect the ionization of the water.

To carry out the method of the present invention, the tub of the washing machine is filled with water. Articles, such as clothes, are placed in the tub. The present invention has been shown to be effective when commercially available detergent or soap powder is placed in the tub in an amount significantly less than that recommended by the manufacturer of the detergent or soap powder. Specifically, only approximately ⅓ of the recommended amount of washing detergent or soap powder has to be used in conjunction with the device according to the present invention in order to obtain a satisfactory wash load. In cases where the local water has a relatively low content of dissolved calcium, magnesium, etc. no detergent or soap powder needs to be used with the present invention.

The self-contained water treatment device of the present invention is placed into the tub. Once the washing machine is turned on to agitate the water in the tub, the water treatment device according to the present invention circulates throughout the water in the tub. The water in contact with the electrodes is thus ionized which ionized water facilitates the washing of the articles in the tub.

As is evident from above, the method of the present invention provides the advantage of allowing cost savings to be realized in connection with reducing the necessary amount of detergents or soap powders. Another advantage of considerable importance afforded by the present invention resides in that the ionization of the water reduces the solid contents and thus the amount of pollution which is flushed into the waterways by the washing machine at the end of the washing cycle.

Although the present invention has been described above in connection with preferred embodiments thereof, various changes and modifications will be apparent to those of ordinary skill in the art. For example, the electrodes of the present invention have been disclosed as being a carbon powder-based electrically conductive material and an aluminum powder-based electrically conductive material. However, any two materials having different electrochemical potentials may be employed as the electrodes, respectively. For example, a copper powder-based electrically conductive material and a zinc powder-based electrically conductive material are quite acceptable. Further, to enhance the decorative effect provided by the electrodes, the base material of the electrodes may be selected with some particular color combination in mind, for example, copper and zinc, copper and silver, or gold and silver, etc. This decorative effect may also be enhanced by providing that portion of the electrically insulative surface which is exposed between the electrodes with a particular color. Accordingly, all such changes and modifications are seen to fall within the true spirit and scope of the present invention as defined by the appended claims.

What is claimed is:

1. A self-contained water treatment device comprising a body, a first electrode integral with said body and comprising a layer of paint of an electrically conductive material, and a second electrode integral with said body and comprising a layer of paint of an electrically conductive material, the electrically conductive paint constituting said first electrode and the electrically conductive paint constituting said second electrode having different electrochemical potentials, whereby when the self-contained device is placed into a reservoir of water such that the water extends between the electrodes, the water is ionized due to the electric potential established between the electrodes.

2. A self-contained water treatment device as claimed in claim 1, and having sufficient buoyancy as to float in water.

3. A self-contained water treatment device as claimed in claim 2, wherein the body itself is of a buoyant material which will float in water and thereby impart said buoyancy to the device.

4. A self-contained water treatment device as claimed in claim 2, wherein said body includes at least one sealed air chamber which imparts the buoyancy to the device.

5. A self-contained water treatment device as claimed in claim 1, wherein said body is generally spheroidal.

6. A self-contained water treatment device as claimed in claim 5, wherein said generally spheroidal body has an electrically insulative outer peripheral surface, and said layers of paint coat the outer peripheral surface of said body.

7. A self-contained water treatment device as claimed in claim 6, wherein said layers of paint are spaced apart in their entirety on the electrically insulative outer peripheral surface of said body.

8. A self-contained water treatment device as claimed in claim 5, wherein said body is hollow and has a plurality of openings extending therethrough and through which openings water can enter the interior of the body, and further comprising a support member integral with and extending within said body, said support member having an electrically insulative surface, and said layers of paint coating the electrically insulative surface of said support member.

9. A self-contained water treatment device as claimed in claim 8, wherein said layers of paint are spaced apart in their entirety on the electrically insulative surface of said support member.

10. A self-contained water treatment device as claimed in claim 8, wherein said support member includes at least one sealed air chamber which imparts sufficient buoyancy to the device as to cause the device to float in water.

11. A self-contained water treatment device as claimed in claim 1, wherein said body has a soft outer portion of an electrically insulative material.

12. A self-contained water treatment device as claimed in claim 11, wherein the paints of said electrodes each comprise an electrically conductive powder and a pliable binding agent, said layers of paint coating the outer portion of said body.

13. A generally spheroidal self-contained water treatment device comprising: a body, a first electrode integral with said body and comprising electrically conductive material, and a second electrode integral with said body and comprising electrically conductive material, the electrically conductive materials of said electrodes having different electrochemical potentials, whereby when the generally spheroidal self-contained device is placed into a reservoir of water such that the water extends between the electrodes, the water is ionized due to the electric potential established between the electrodes.

14. A generally spheroidal self-contained water treatment device as claimed in claim 13, wherein said electrodes are spaced apart in their entirety from one another.

15. A generally spheroidal self-contained water treatment device as claimed in claim 13, and having sufficient buoyancy as to float in water.

16. A generally spheroidal self-contained water treatment device comprising: a body of an electrically insulative plastic having the shape of a segment of a spheroid, a first electrode integral with said body and comprising a powdered electrically conductive material, and a second electrode integral with said body and comprising a powdered electrically conductive material, said electrodes being bound by plastic material and having the shapes of the remaining segments of the spheroid, respectively, and the electrically conductive materials of said electrodes having different electrochemical potentials, whereby when the generally spheroidal self-contained device is placed into a reservoir of water such that the water extends between the electrodes, the water is ionized due to the electric potential established between the electrodes.

17. A generally spheroidal self-contained water treatment device as claimed in claim 16, and having sufficient buoyancy as to float in water.

18. A generally spheroidal self-contained water treatment device as claimed in claim 16, wherein said electrodes are spaced apart in their entirety from one another.

19. A generally spheroidal self-contained water treatment device comprising: a body, a first electrode integral with said body and comprising electrically conductive material, and a second electrode integral with said body and comprising electrically conductive material, said electrodes having spherical outer surfaces and said body being interposed therebetween, and the electrically conductive materials of said electrodes having different electrochemical potentials, whereby when the generally spheroidal self-contained device is placed into a reservoir of water such that the water extends between the electrodes, the water is ionized due to the electric potential established between the electrodes.

20. A generally spheroidal self-contained water treatment device as claimed in claim 19, and having sufficient buoyancy as to float in water.

21. A generally spheroidal self-contained water treatment device as claimed in claim 19, wherein said electrodes are spaced apart in their entirety from one another.

* * * * *